Nov. 1, 1949   A. N. MILSTER   2,486,965
BRAKE TESTING DEVICE
Filed Dec. 16, 1944   2 Sheets-Sheet 1
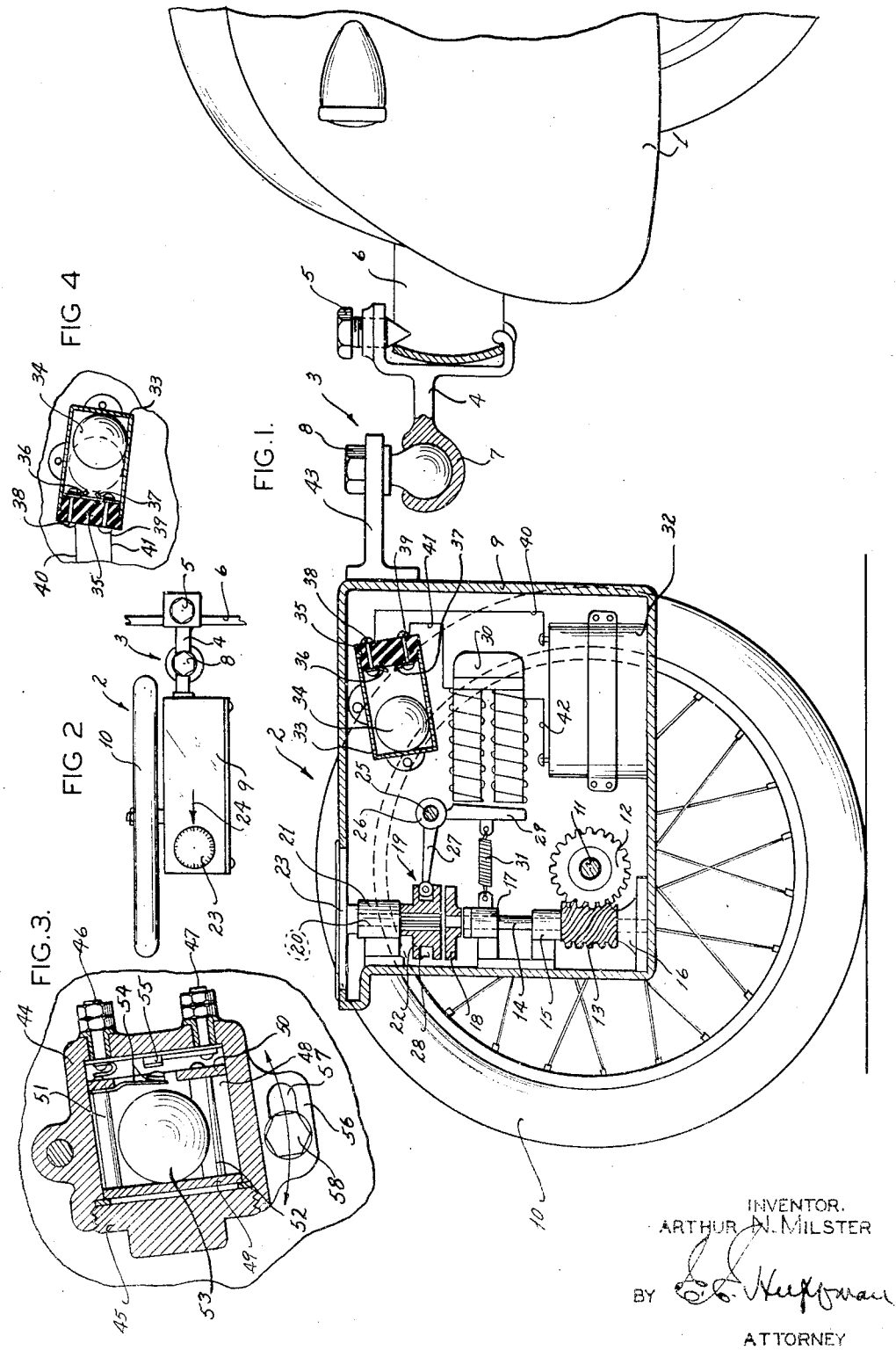
INVENTOR.
ARTHUR N. MILSTER
BY
ATTORNEY Nov. 1, 1949     A. N. MILSTER     2,486,965
BRAKE TESTING DEVICE
Filed Dec. 16, 1944     2 Sheets-Sheet 2
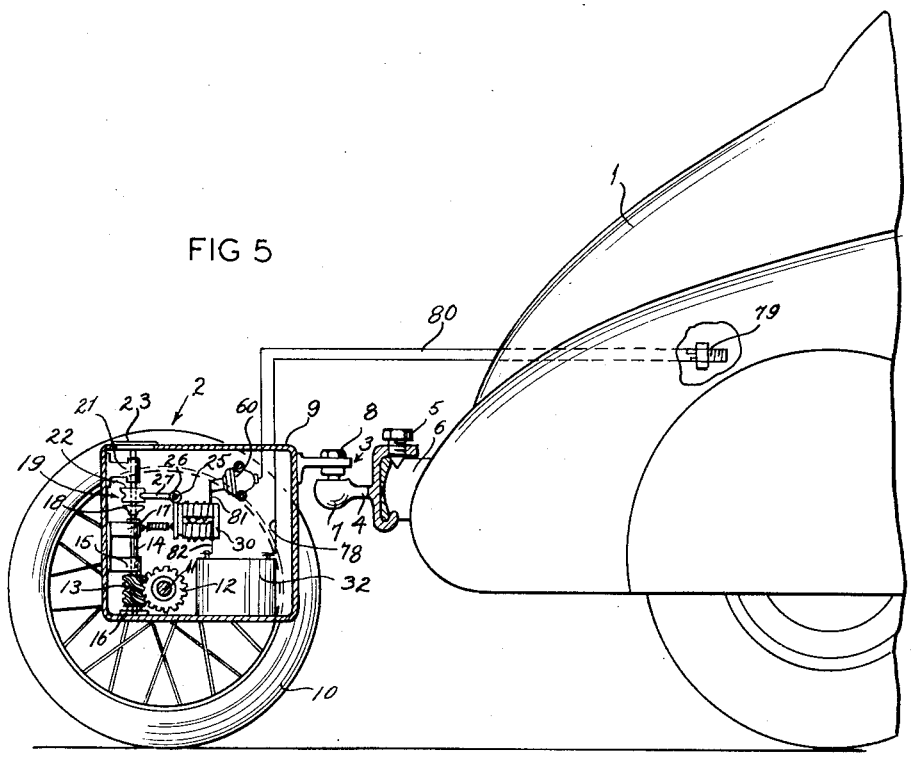
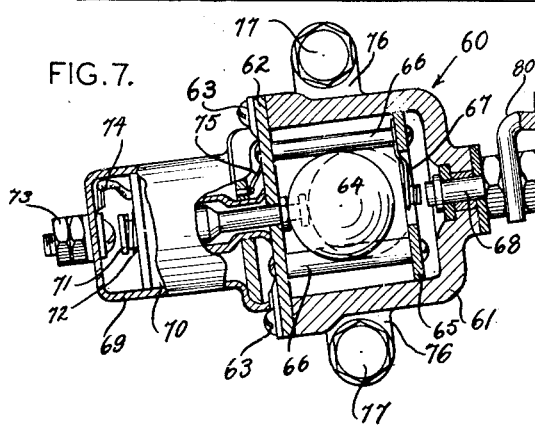
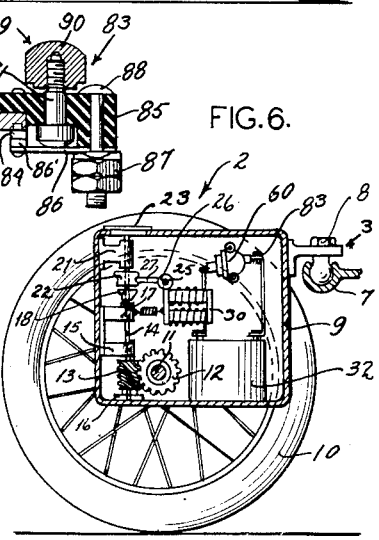
INVENTOR.
ARTHUR N. MILSTER
BY
ATTORNEY.

Patented Nov. 1, 1949

2,486,965

UNITED STATES PATENT OFFICE 2,486,965

BRAKE TESTING DEVICE

Arthur N. Milster, Ferguson, Mo., assignor to Wagner Electric Corporation, St. Louis, Mo., a corporation of Delaware Application December 16, 1944, Serial No. 568,533

11 Claims. (Cl. 73—128)

This invention relates to a brake testing device and in its more specific aspects is directed to a device for measuring the stopping distances of automotive vehicles and other moving bodies that are self-contained units.

One of the objects of the invention is to provide a stopmeter or deceleration or acceleration distance measuring device which is readily securable to and detachable from the vehicle or moving body to be tested so as to enable the determination of the stopping distance thereof without incorporating any part thereof with the operation of the vehicle.

Another object of the invention is to provide a device for measuring the distance required to stop the moving body or vehicle by means of a measuring device that employs an inertia type switch of the rolling ball type to control said measuring device.

Another object of the invention is to provide a stop-meter having a switch therein capable of controlling the energization of the operating mechanism which is responsive to gravitational action and inertia of the towing vehicle.

A still further object of the invention is to provide a stopmeter of the fifth wheel type having an inertia switch therein which is responsive to the deceleration or acceleration of the body being tested and has means therein to keep the switch closed until manually released.

Another and still further object of the invention is to provide a stopmeter of the fifth wheel type having an inertia switch therein that is normally open and closable upon the deceleration or acceleration of the towing vehicle and which is returned to its original position by gravitational action when the towing vehicle has come to rest.

Another and still further object of the invention is to provide a stopmeter for a moving body or towing vehicle in which a normally open inertia switch is provided that is closable upon deceleration or acceleration of the moving body or vehicle and is immediately openable when the vehicle or moving body comes to rest.

Another object of the invention is to provide a stopmeter involving mechanism for measuring the stopping distance of a moving body or vehicle incorporating a normally open inertia switch of the rolling ball type that energizes a control circuit for the meter during only the actual period of deceleration.

Another and still further object of the invention is to provide a device for measuring the stopping distances from a predetermined speed of a moving body or vehicle readily securable thereto incorporating a rolling ball type of inertia switch therein having means therein to keep it closed until released by the operator.

Other and still further objects of the invention will occur to those skilled in the arts to which this invention pertains as the description proceeds, which, taken in connection with the accompanying drawings, sets forth a preferred embodiment of the invention and selected modifications thereof but such disclosures are not to be construed as a limitation of the invention which is limited only by the appended claims, and any and all modifications, alterations and variations of structure coming within the spirit and scope thereof are deemed to be included herein.

In the drawings:

Figure 1 is an elevational view, partly in section, of the distance measuring device attached to a towing vehicle;

Figure 2 is a plan view thereof;

Figure 3 is a modified view of the inertia switch;

Figure 4 is a view of the inertia switch of Figure 1 shown in the position for the testing of acceleration;

Figure 5 is a vertical elevational view, partly in section, of a modified form of the disclosure of Figure 1;

Figure 6 is a vertical elevational view of a portion of the trailer vehicle showing a variation of the disclosure of Figure 5; and Figure 7 is an enlarged sectional view of the inertia switch disclosed in Figure 6.

Various devices have been developed in the arts for measuring the distances required for bringing moving bodies or vehicles to rest from a predetermined speed or the time in which they are brought to rest, the latter factor being a direct function of the distance necessary. Whether this information is given in terms of lineal distances or lapses of time, it is the efficiency and quality of the brakes on the moving body or towing vehicle that is being measured. Certain prior art developments have included devices which have deficiencies in that they do not record the correct stopping distance. A number of these devices are so constructed and organized that they are operatively associated with certain mechanisms on the towing vehicle used for the control of same. The instant invention seeks to eliminate the mechanical or electrical association of the measuring device with the control mechanism of the towing vehicle to thereby make the stop measuring instrument for distance determinations a self-contained unit that is readily attachable to and detachable from the towing vehicle or moving body whose stopping efficiency is to be measured and is operable without regard thereto other than being towed thereby.

The objects and advantages set forth above are obtained in the device disclosed in the several views of the drawings in which 1 is a towing vehicle or moving body and 2 refers generally to the stopmeter that is attached thereto by means of a conventional trailer hitch 3. The trailer hitch comprises a bracket 4 having a holding screw 5 therein whereby it can be readily secured to and detached from the rear bumper 6 of the towing vehicle 1. The bracket 4 has a socket 7 receiving the spherical-headed bolt and nut assembly 8 to enable a limited degree of relative movement between the trailer device 2 and the towing vehicle 1.

The trailer device comprises a housing 9 supported on a wheel 10 which is preferably of the bicycle type fixed to an axle 11. The instant disclosure shows only one wheel 10 but it is obvious that a second wheel may be provided to assist in the support of housing 9. Axle 11 is mounted in a suitable bearing (not shown) having a gear 12 thereon which is engaged with a gear 13 fixed to shaft 14 rotatably mounted in a pair of bearings 15 and 16 secured to one of the walls of housing 9. A third bearing 17 may be provided to support the upper end of shaft 14. The gears 12 and 13 are preferably of the hypoid type in order to increase the efficiency of transmission and to reduce lost motion. Other types of gearing, of course, are contemplated within the purview of the instant invention.

Secured to the upper end of shaft 14 is the driving portion 18 of clutch element 19. Concentrically disposed with respect to shaft 14 is a second shaft 20 rotatably disposed in a journal 21 likewise secured to one of the walls of housing 9. Shaft 20 is splined at its lower end and receives the driven portion 22 of the clutch 19, portion 22 being slidable with respect to shaft 20 by reason of the splined connection. Secured to the upper end of shaft 20 is a disc 23 which is the gage constituting the measuring device of the meter and in the particular instance determines the actual distance traversed in order to bring the towing vehicle or moving body to rest. Suitable indicia are provided on the disc to enable the correct reading thereof and the arrow 24 constitutes the reference point in determining each of the readings of the device. Any type of measuring device is contemplated in lieu of 23 as long as the same may be controlled by a clutch such as 19.

Rotatably mounted on a pin 25 held in one wall of housing 9 is a bell-crank 26, one of whose arms 27 is received in a slot 28 provided in the driven element of clutch 19 and the other arm 29 of the bell-crank 26 is disposed opposite the electro-magnet 30 secured to one of the walls of housing 9. A spring 31 is connected between arm 29 and bearing 17 each of which has eyed bosses thereon in which the hooked ends of spring 31 are received in a well-known manner. Spring 31 normally maintains clutch 19 in its disengaged position to render the gage inoperative except at such times when the towing vehicle or moving body to which it is secured is performing a stopping test. The electro-magnet 30 is likewise secured to one of the walls of housing 9 in a conventional manner.

Mounted in housing 1 is a source of electrical energy 32 preferably in the form of a battery. Also secured to one of the walls of housing 9 is a switch housing 33 having a rolling ball 34 therein. The housing 33 is closed by means of a piece of insulating material 35 in which are secured two fixed contacts 36 and 37 by means of screw elements 38 and 39 or by any other appropriate means. The switch contacts 36 and 37, electro-magnet 30 and battery 32 are connected in series by means of conductors 40, 41, and 42. The battery 32 may be secured against relative movement with respect to housing 9 by any conventional and well-known means. The housing 9 has a bracket 43 and may be secured to said housing in a well-known manner for attachment to the trailer hitch.

The rolling ball 34 in its housing 33, as shown in Figure 1, is so positioned as to enable it to control the measurement of the decelerating or stopping distance of the moving body or towing vehicle and in Figure 4 the same switch is shown with the parts reversed but functioning in a manner similar to that in Figure 1 for measuring the accelerating distance of the moving body or vehicle. In this instance the inertia switch has the same ball 34 in housing 33 and is provided with a closure element 35 having the same contacts 36 and 37 held therein by means of retaining elements 38 and 39. Conductors 40 and 41 connect the inertia switch, electro-magnet and battery in the same manner.

A modified form of the inertia switch is shown in Figure 3 which comprises a housing 44 pivoted at its upper side to housing 9 and has a closure element 45 threaded therein. Arranged at the closed end of housing 44 is a pair of contacts 46 and 47 secured therein in a conventional manner. Within the bore in housing 44 is a frame element 48 which comprises a pair of ring-like or disc elements 49 and 50 held in spaced relation within the housing 44 by means of a plurality of rods 51 and 52. The inner assemblage comprises a cage for holding a rolling ball 53. Terminal 46 is insulated from housing 44 and is electrically connected to a movable contact 54 secured to rod 51 and terminal 47, insulated from housing 44, has secured thereto a fixed contact 55 whose terminal is opposite the contact terminal 54. The housings 33 and 44 are preferably filled with a suitable lubricant, to facilitate the operation of the inertia switch, whose primary function is to prevent the erratic operation of the switch by having the fluid function in the nature of a dampener to prevent the opening of the inertia switch upon moderate variations in acceleration or deceleration of the moving body or towing vehicle.

The operation of the previously described device is dependent upon the changes in rate of movement that occur in the towing vehicle or moving body and the trailer unit which causes movement of the rolling ball 34 relative to housing 33 in which the same is retained. After being brought up to a predetermined speed, the towing vehicle or moving body has its brake applied and that will immediately cause the towing vehicle and the trailer to slow down but the ball 34 will continue its forward movement engaging contacts 36 and 37 of the inertia switch. When the inertia switch is closed, electro-magnet 30 will be energized and arm 29 of bell-crank 26 moved toward it simultaneously sliding the driven element 22 of clutch 19 on the splined end of shaft 20 into engagement with the driven element 18 of the clutch and thus initiating movement in the dial or gage 23. The inertia switch will remain closed until the towing vehicle or moving body comes to rest whereupon the measuring device may be read indicating the actual stopping distance required. As previously indicated, since housing 33 of the inertia switch is filled with liquid, such liquid will assist ball 34 in remaining in engagement with the contacts 36 and 37 in order to obviate the effects of relations of road surface, et cetera. The damping effect of the liquid is utilized to perform this function. It is apparent that as soon as the towing vehicle 1 has come to rest, ball 34 will be returned to the position shown in Figure 1 and open the circuit to electro-magnet 30, thereby opening clutch 19 and enabling the reading of the distance required in order to bring the towing vehicle 1 to rest.

The operation of the device is Figure 3 is similar to that shown in Figure 1. In this instance the rolling ball 53 will engage movable contact 54 and urge the same into engagement with fixed contact 55. The rolling ball 53, by reason of the bar structures 51 and 52, is more sensitive to changes in movement than is the device in Figure 1 and will, therefore, be more responsive to the decelerating action of the towing vehicle 1. In order to take in consideration various conditions under which the switch may be moved, housing 44 is provided with a bracket 56 having a slot 57 therein enabling housing 44 to be tilted at varying angles in order to further alter the sensitiveness of the device and thereby the responsiveness of ball 53 to the decelerating action, it being apparent that when housing 44 is tilted at its maximum, it will be less responsive and when moved such that the opposite end of the slot 57 engages the holding screw 58, it will be more sensitive to the decelerating action of the towing vehicle or moving body 1.

The disclosure in Figure 4 shows the inertia switch set forth in Figure 1 intended to operate as an acceleration responsive device. The housing 33 is tilted at a different angle than that set forth in Figure 1, such that rolling ball 34 will move into engagement with contacts 36 and 37 when the towing vehicle 1 or other moving body is accelerated and will remain in engagement with the switch contacts 36 and 37 until the vehicle assumes a uniform speed, whereupon ball 34 will return to the full line position, it being noted that the dotted line position (Figure 4) is that assumed when the vehicle is accelerated. The co-operation of the measuring instruments and transmission thereof in Figure 4 is identical with that set forth in connection with the disclosure in Figure 1.

The modification shown in Figure 5 shows the trailer 2 and the towing vehicle 1 connected together by hitch 3 as set forth above. In each of these disclosures an inertia switch similar in character to that set forth in Figure 3 is provided which is modified to include a positive retaining device. The inertia switch 60 in Figures 5 and 6 is identical and comprises a housing 61 having a closure plate 62 maintained thereon by suitable securing means such as a plurality of screws 63. A cage to receive ball 64 is arranged within the housing 61 which comprises an end plate 65 having a plurality of rods 66 arranged therein within which the ball 64 rolls, the rod construction facilitating the rapid movement of the ball. The chamber in housing 61 is filled with a suitable liquid that functions in the nature of a damping medium as outlined above. A movable contact and spring element 67 is secured to one of the rods 66, the contact element thereof disposed in axial alignment with ball 64. A fixed contact 68 is arranged in the closed end of housing 61 opposite the contact or movable element 67.

Secured to the plate or closure element 62 is a housing 69 in which a solenoid 70 is arranged. The screws or retaining means 63 may be employed to secure housing 69 to plate 62, if desired. The solenoid has a plunger or armature 71 arranged therein normally urged to one end of the solenoid by a spring 72. A connector element 73 is fixed in the end of housing 69 having a lead 74 connected thereto which is one of the terminals of solenoid 70. The other terminal of the solenoid is connected by means of lead 75 to one of the rods 66 and thence to the movable contact 67.

Suitable bosses 76 are formed on housing 61 which are properly bored to receive screws 77 intended to secure same to one of the walls of housing 9 enclosing the elements of the stopmeter mechanism.

The stopmeter is constructed identically with that described above and the same pertinent numerals are applied to indicate the same parts in the modified structure.

The circuit connections in the modification of Figures 5 and 6 provide for a means to hold the rolling ball 64 in engagement with the movable contact 67 in order that the ball will be positively urged thereagainst to maintain the contacts 67 and 68 in engagement irrespective of road shocks and other disturbing influences that might tend to prematurely open the circuit for the electro-magnet 30. In order to set in motion the gage or indicator in the stopmeter upon deceleration of the towing vehicle, the rolling ball 64 will move to the right as indicated in Figure 7 when the trailer is decelerating. This will bring contact elements 67 and 68 into engagement with each other and thereby establish a circuit to the electro-magnet 30 by closing same, the circuit comprising battery 32, lead 78, manual switch 79, lead 80, inertia switch 60 including solenoid 70, and leads 81 and 82. When this circuit is closed due to the decelerating movement of the towing vehicle, solenoid 70 will be energized in the manner such that plunger 71 will be urged to the right and will remain energized as long as the circuit is closed. When the test has been completed, the aforementioned circuit will remain closed until manual switch 79 has been opened. The switch 79 is normally intended to be operated hydraulically under the influence of the brake pedal such that the release of the brakes will simultaneously open the circuit. The switch 79 may be the conventional stoplight switch customarily incorporated in a standard hydraulic brake mechanism or it may be any other type of manually operated switch.

The control just described may be made self-contained in the trailer vehicle by providing a switch 83, as shown in Figure 7, which shows the conductor 80 connected between one of the terminals of the inertia switch and one of the contacts 84 on switch 83. The conductor 80 may be a continuation of the element supporting the contact 84 as indicated. The contact 84 is fixed in a suitable insulating block 85 and a relatively movable contact and spring element 86 with contact 86' thereon is likewise fixed to the block 85 terminating in terminal 87. Suitable retaining elements, such as rivets 88 or other means may be used to secure the terminal 87 and the contact to the insulating block 85. A contact separator 89 is provided comprising a knob 90 and a plunger 91 having an enlarged head thereon which, upon being depressed, will separate the normally closed contacts 84 and 86' to open the circuit previously described. The circuit is manually broken by depressing button 90, which de-energizes solenoid 70, allowing ball 64 to roll away from contact 67, thereby opening the circuit. Contacts 84 and 86 reclose after button 90 is no longer manually depressed.

The disclosure of Figure 5 contemplates a switch 79 either brake pedal or push-button operated by the towing vehicle operator whereas in Figure 6 the switch is mounted in the trailer making it a self-contained unit.

Having fully described by invention, that which I claim as novel and desire to protect by Letters Patent of the United States is:

1. In device to measure the distance required to effect a rate of speed change in a vehicle, a trailer provided with a supporting wheel and connectable to the vehicle; an indicator in said trailer; means to operate said indicator by said wheel; a clutch to control the application of said means; an electromagnet to operate said clutch; an electrical circuit for said electromagnet; and a gravity released inertia switch in said electric circuit responsive to rate of speed change of said vehicle.

2. In a device to measure the distance required to effect a rate of speed change in a vehicle, a trailer provided with a supporting wheel and connectable to the vehicle; an indicator; means to operate said indicator by said wheel; a clutch to control the application of said means; an electromagnet to operate said clutch; an electrical circuit for said electromagnet; and a gravity released inertia switch in said electric circuit responsive to rate of speed change of said vehicle.

3. In a device to measure the distance required to effect a rate of speed change in a vehicle, a trailer provided with a supporting wheel and connectable to the vehicle; an indicator in said trailer; means to operate said indicator by said wheel; a clutch to control the application of said means; an electromagnet to operate said clutch; a circuit for said electromagnet; and an inertia switch in said circuit closed when the vehicle is decelerating to thereby control the operation of said indicator.

4. In a device to measure the deceleration distance of a vehicle, a trailer provided with a supporting wheel and connectable to the vehicle; an indicator in said trailer; means to operate said indicator by said wheel; a clutch to control the application of said means to said indicator; an electromagnet to operate said clutch; a circuit for said electromagnet; an inertia switch in said circuit closed when the vehicle is decelerating to control the operation of said indicator; and means to keep said inertia switch closed until deceleration ceases.

5. In a device to measure the deceleration distance of a vehicle, a trailer provided with a supporting wheel and connectable to the vehicle; an indicator in said trailer; means to operate said indicator by said wheel; a clutch to control the application of said means to said indicator; an electromagnet to operate said clutch; a circuit for said electromagnet; an inertia switch in said circuit closed when the towing vehicle is decelerating to control the operation of said indicator; means to keep said inertia switch closed; and means to open said circuit after deceleration ceases.

6. In a device to measure the distance required to effect a change of rate of speed in a vehicle, a trailer provided with a supporting wheel and connectable to the vehicle; an indicator in said trailer; means to operate said indicator by said wheel; a clutch to control the application of said means to said indicator; an electromagnet to operate said clutch; an electrical circuit for said electromagnet; and an inertia switch closed by changes in the rate of speed in said vehicle to energize said circuit to thereby control the operation of said indicator.

7. A device for measuring stopping distances of a moving body comprising a measuring device, means for operating said device; electrical means for controlling the operating means, the circuit of said control means comprising a manually operable switch and a second switch; and deceleration responsive means for operating said second switch.

8. A device for measuring stopping distances comprising a trailer having a road engaging wheel, a device in said trailer unit for measuring the stopping distance; transmission means driven by said wheel for operating said device; a clutch for controlling the operation of said transmission means; an electrically operable means for controlling said clutch, the circuit for said electrically operable means comprising a normally open manually operable switch and a second switch; and deceleration responsive means for closing said second switch.

9. A device for measuring stopping distances comprising a housing securable to a vehicle to be tested; a road engaging wheel supporting said housing; a measuring device in said housing; means for driving said measuring device from said wheel and including a clutch for controlling said means; an electro-magnet for actuating said clutch, the circuit for said electro-magnet including a manually operated switch, a second switch, and a holding solenoid for said second switch; and deceleration responsive means for closing said second switch.

10. A device for measuring stopping distances comprising means securable to a vehicle whose brakes are to be tested and including a road engaging wheel; a measuring instrument in said means; means for driving said instrument from said wheel and including a normally open control member; an electro-magnet for actuating said control member to closed position, the circuit for said electro-magnet comprising a manually operable switch, a second switch, and a solenoid for holding said second switch in closed position; and deceleration responsive means for closing said second switch, said manually operable switch, when opened, opening said circuit for de-energizing said elcetro-magnet and said solenoid for enabling said control member to be actuated to open position and said second switch to be opened.

11. A device for measuring distances required to effect a change of rate of speed in a moving body comprising a measuring instrument; means for operating said measuring instrument and including a clutch for controlling said means; an electro-magnet for controlling said clutch, the circuit for said electro-magnet including a first switch and a second switch; and gravity responsive means for actuating said second switch when the moving body changes its rate of speed.

ARTHUR N. MILSTER.

REFERENCES CITED

The following references are of record in the file of this patent:

UNITED STATES PATENTS

| Number | Name | Date |
| --- | --- | --- |
| 1,165,592 | Hall et al. | Dec. 28, 1915 |
| 1,288,128 | Murray | Dec. 17, 1918 |
| 1,414,910 | Watson | May 2, 1922 |
| 1,950,583 | Watkins | Mar. 13, 1934 |
| 2,279,409 | Milster et al. | Apr. 14, 1942 |
| 2,305,789 | Kempf | Dec. 22, 1942 |
| 2,325,910 | Hetzel | Aug. 3, 1943 |
| 2,370,141 | Brunner | Feb. 27, 1945 |